United States Patent [19]
Ohtaka et al.

[11] Patent Number: 5,262,819
[45] Date of Patent: Nov. 16, 1993

[54] COMPACT FOCUS DETECTING DEVICE SUITABLE FOR INCORPORATION INTO AN OPTICAL APPARATUS

[75] Inventors: Keiji Ohtaka; Takeshi Koyama; Yasuo Suda, all of Yokohama, Japan

[73] Assignee: Canon Kabushiki Kaishi, Tokyo, Japan

[21] Appl. No.: 824,873

[22] Filed: Jan. 22, 1992

Related U.S. Application Data

[63] Continuation of Ser. No. 548,849, Jul. 6, 1990, abandoned.

[30] Foreign Application Priority Data

| Jul. 7, 1989 | [JP] | Japan | 1-176467 |
| Jul. 7, 1989 | [JP] | Japan | 1-176468 |
| Jul. 7, 1989 | [JP] | Japan | 1-176469 |

[51] Int. Cl.⁵ ............................................. G03B 13/00
[52] U.S. Cl. ....................................... 354/402; 354/407
[58] Field of Search ........................ 354/402, 406–408

[56] References Cited

U.S. PATENT DOCUMENTS

| 4,774,539 | 9/1988 | Suda et al. | 354/406 |
| 4,841,326 | 6/1989 | Koyama et al. | 354/406 |
| 4,859,842 | 8/1989 | Suda et al. | 354/408 |
| 4,878,078 | 11/1989 | Koyama et al. | 354/402 |
| 4,901,102 | 2/1990 | Karasaki et al. | 354/408 |
| 4,908,504 | 3/1990 | Karasaki et al. | 354/408 |
| 4,954,701 | 9/1990 | Suzuki et al. | 354/406 |
| 4,959,677 | 9/1990 | Suda et al. | 354/402 |
| 4,992,819 | 2/1991 | Ohtaka et al. | 354/408 |
| 5,109,154 | 4/1992 | Higashihara et al. | 354/407 |

FOREIGN PATENT DOCUMENTS

| 59-107311 | 6/1984 | Japan . |
| 59-107313 | 6/1984 | Japan . |
| 62279835 | 5/1989 | Japan . |
| 63274940 | 5/1990 | Japan . |

*Primary Examiner*—David M. Gray
*Attorney, Agent, or Firm*—Fitzpatrick, Cella, Harper & Scinto

[57] ABSTRACT

A compact focus detecting device featuring increased optical paths includes a first detecting system having first light intensity distribution forming structure for forming a light beam passing through the objective lens a light intensity distribution of which varies in relative position according to the focus state of the objective lens. A first light receiving sensor receives the first light intensity distribution and outputs a first signal indicative of the focused state of the objective lens. The first detecting system has a first detection field and a first optical path. A second detecting system has a second detecting field with a center spaced apart from the center of the first detection field, and a second optical path. The second detecting system includes second light intensity distribution forming structure for forming from the light beam passing through the objective lens a light intensity distribution which varies in relative position according to the focused state of the objective lens. A second light receiving sensor receives the second light intensity distribution and outputs a second signal indicative of the focus state of the objective lens. A light transmitting optical member is provided for adjusting the length of the first and second optical paths. Preferably, the optical member comprises a block having an internal reflecting surface.

16 Claims, 10 Drawing Sheets

COMPACT FOCUS DETECTING DEVICE SUITABLE FOR INCORPORATION INTO AN OPTICAL APPARATUS

This application is a continuation of application Ser. No. 07/548,849 filed Jul. 6, 1990, now abandoned.

BACKGROUND OF THE INVENTION

1. Field of the Invention

This invention relates to a focus detecting device suitable for a photographic camera, a video camera or the like, and in particular to a focus detecting device suitable for dividing the pupil of an objective lens into a plurality of areas, forming light intensity distributions regarding a plurality of object images by the use of light beams passing through said areas, and finding the relative positional relation between the plurality of light intensity distributions to thereby detect the in-focus state of the objective lens.

2. Related Background Art

As a passive type focus detecting system utilizing a light beam passing through an objective lens, there is the so-called correlation system.

This correlation system is well known, for example, from Japanese Laid-Open Patent Application No. 59-107311, Japanese Laid-Open Patent Application No. 59-107313, etc.

FIG. 13 of the accompanying drawings is a schematic view of the optical system of a focus detecting device using the prior-art correlation system.

In FIG. 13, the reference numeral 61 designates an objective lens, and the reference numeral 62 denotes a field mask disposed near the predetermined imaging plane of the objective lens 61. The reference numeral 63 designates a field lens disposed near the predetermined imaging plane. The reference numeral 64 denotes a secondary optical system comprised of two lenses 64-1 and 64-2 disposed symmetrically with respect to the optic axis of the objective lens 61. The reference numeral 65 designates light receiving means having two light receiving element arrays 65-1 and 65-2 disposed rearwardly of the two lenses 64-1 and 64-2 correspondingly thereto. The reference numeral 66 denotes a stop having two opening portions 66-1 and 66-2 disposed rearwardly of the two lenses 64-1 and 64-2 correspondingly thereto. The reference numeral 67 designates the exit pupil of the objective lens 61 which is comprised of two divided areas 67-1 and 67-2.

The field lens 63 has the function of imaging the opening portions 66-1 and 66-2 on the areas 67-1 and 67-2, respectively, of the exit pupil 67, and light beams passed through the areas 67-1 and 67-2 may form light intensity distributions on the light receiving element arrays 65-1 and 65-2, respectively. It is to be understood that the light includes not only visible light but also invisible light.

In the focus detecting device shown in FIG. 13, where the imaging point of the objective lens 61 is forward of the predetermined imaging plane, the light intensity distributions regarding the object images formed on the two light receiving element arrays 65-1 and 65-2, respectively, become close to each other, and where the imaging point of the objective lens 61 is rearward of the predetermined imaging plane, the light intensity distributions formed on the two light receiving element arrays 65-1 and 65-2, respectively, become far from each other. Moreover, the amount of deviation between the light intensity distributions formed on the two light receiving element arrays 65-1 and 65-2, respectively, is in a certain functional relation with the amount of out-of-focus of the objective lens 61 and therefore, if that amount of deviation is calculated by suitable calculating means, the direction and amount of out-of-focus of the objective lens 61 can be detected.

The focus detecting device shown in FIG. 13 is effecting distance measurement for an object existing substantially centrally of the object range photographed by the objective lens.

In contrast, a focus detecting device capable of accomplishing focus detection with respect to any other measuring point than the central portion of the photographing range has previously been proposed by the applicant in Japanese Patent Application No. 62-279835.

FIG. 14 of the accompanying drawings is a schematic view of the optical system of a focus detecting device for a plurality of distance measuring points proposed in Japanese Patent Application No. 62-279835. In FIG. 14, the reference numeral 71 designates a field mask, the reference numeral 72 denotes a field lens, the reference numeral 73 designates a stop having two openings 73-1 and 73-2, the reference numeral 74 denotes a secondary optical system comprising two lenses 74-1 and 74-2, and the reference numeral 75 designates a sensor. The objective lens 61 shown in FIG. 13 is not shown in FIG. 14.

In FIG. 14, the field mask 71 has a plurality of openings 71a–71e correspondingly to a plurality of fields of view to be focus-detected, and pairs of sensor arrays 75a1 and 75a2, 75b1 and 75b2, 75c1 and 75c2, 75d1 and 75d2, and 75e1 and 75e2 are provided as the sensor unit 75 so as to receive pairs of light intensity distributions which the light beams controlled by the field mask 71 form by the secondary optical system 74.

In FIG. 14, detection is effected in five areas, i.e., the central portion of the photographing picture plane and four locations on both sides thereof. It is very important for applying the focus detecting device to a camera that focus detection can be effected in a plurality of areas in the photographing picture plane by such a simple construction.

In the focus detecting device shown in FIG. 14, depending on the focus state of the objective lens, the direction in which the two light intensity distributions on the sensor move relative to each other is a vertical direction and therefore, detection is possible only for an object having a variation in the light intensity distribution in this direction, and accuracy of distance measurement may be reduced for an object having a variation in the light intensity distribution only in a direction perpendicular to said direction, such as, for example, a black and white edge pattern with a vertical line as a boundary.

Therefore, the applicant has proposed in Japanese Patent Application No. 63-274940 a focus detecting device which can accomplish distance measurement even for an object whose light intensity distribution varies only in one direction, i.e., a vertical or horizontal direction, near the center of the photographing range and moreover, can accomplish detection even at a plurality of other points than the vicinity of the center of the photographing range.

FIG. 15 of the accompanying drawings shows the essential portions of the focus detecting device proposed in Japanese Patent Application No. 63-274940.

In FIG. 15, the reference numeral 31 designates a field mask having, for example, a cruciform opening 31-1 intersecting substantially at the center of the photographing picture plane of an objective lens (a photo-taking lens), not shown, and vertically long openings 31-2 and 31-3 on both sides of the cruciform opening 31-1. The reference numeral 32 denotes a field lens comprising three areas 32-1, 32-2 and 32-3 each having a predetermined optical characteristic correspondingly to the three openings 31-1, 31-2 and 31-3 in the field mask 31. The reference numeral 33 designates a stop having a vertical pair of openings 33-1a and 33-1b and a horizontal pair of openings 33-1c and 33-1d in the central portion thereof, and two pairs of openings 33-2a and 33-2b, 33-3a and 33-3b in the marginal portion thereof. The areas 32-1, 32-2 and 32-3 of the field lens 32 have the function of imaging the openings 33-1, 33-2 and 33-3 in the stop 33 which form respective pairs near the exit pupil of the photo-taking lens not shown. The reference numeral 34 denotes a secondary optical system which, as a whole, has four pairs of secondary imaging lenses. That is, the secondary optical system 34 as a whole comprises eight secondary imaging lenses 34-1a, 34-1b, 34-1c, 34-1d, 34-2a, 34-2b, 34-3a and 34-3b disposed rearwardly of the openings in the stop 33 correspondingly thereto.

The reference numeral 35 designates a light receiving element unit (a sensor unit) which, as a whole, has four pairs of sensor arrays. That is, the light receiving element unit 35 as a whole comprises eight sensor arrays 35-1a, 35-1b, 35-1c, 35-1d, 35-2a, 35-2b, 35-3a and 35-3b disposed correspondingly to the secondary imaging lenses so as to receive the images formed thereby.

FIG. 16 of the accompanying drawings illustrates image areas formed on the surface of the sensor 35 of FIG. 15. Areas 36-1a, 36-1b, 36-1c and 36-1d are the image areas of the central opening 31-1 in the field mask 31, and show a state in which a light beam transmitted through the central portion 32-1 of the field lens 32 is controlled by the openings 33-1a, 33-1b, 33-1c and 33-1d, and thereafter is formed on the surface of the sensor 35 by the secondary imaging lenses 34-1a, 34-1b, 34-1c and 34-1d rearward of said openings. The reference characters 36-2a and 36-2b denote the image areas of the opening 31-2 in the marginal portion of the field mask 31, and these image areas show a state in which a light beam transmitted through the marginal portion 32-2 of the field lens 32 is controlled by the openings 33-2a and 33-2b in the stop 33, and thereafter is fomred on the sensor unit 35 by the secondary imaging lenses 34-2a and 34-2b rearward of said openings. Likewise, openings 36-3a and 36-3b are the image areas of the opening 31-3 in the marginal portion of the field mask 31, and show image areas in which a light beam transmitted through the marginal portion 32-3 of the field lens 32 is controlled by the openings 33-3a and 33-3b in the stop 33, and thereafter is formed on the surface of the sensor 35 by the secondary imaging lenses 34-3a and 34-3b rearward of said openings.

The focus detecting device shown in FIG. 15 is designed such that focus detection can be accomplished in the center of the field of view in the photographing range as well as in the other areas than the center of the field of view, and this has led to the tendency that the secondary optical system, the light receiving means, etc. become relatively bulky due to the relation with the length of the optical path leading from the secondary optical system to the light receiving means.

Also, it is desirable from the point of detection accuracy to set the imaging magnification of the secondary optical system to a suitable value (e.g. about ⅓ time), but according to this, the position at which the secondary optical system is disposed is determined almost primarily by the full length of the focus detecting system and therefore, the degree of freedom of the arrangement of the various optical elements has been limited.

SUMMARY OF THE INVENTION

It is an object of the present invention to provide a focus detecting device capable of accomplishing highly accurate focus detection in which various optical elements from a secondary imaging optical system to a light receiving unit are appropriately set, whereby the detection in a plurality of areas in the photographing range is made possible and yet the compactness of the entire device is achieved and there are few limitations in the degree of freedom of assemblage and further the optimization of the imaging magnification of the secondary imaging optical system is made easy.

It is also an object of the present invention to provide a focus detecting device in which when the luminance of an object to be photographed is low and focus detection becomes difficult by only natural light (outdoor light), a pattern of a predetermined shape is projected toward the object to be photographed from an auxiliary illuminating system provided in a camera body or a stroboscopic lamp to thereby form a pattern on the surface of the object to be photographed and the light intensity distribution of the image of said pattern is detected, whereby for objects of any luminance, highly accurate focus detection can be accomplished at a plurality of points in the photographing range.

It is a further object of the present invention to provide a device in which at least first and second focus detecting systems are disposed rearwardly of the predetermined imaging plane of an objective lens, said focus detecting systems each having a secondary optical system for forming a plurality of light intensity distributions regarding an object image by the use of light beams passed through different areas of said objective lens when the in-focus state of said objective lens is to be found by the utilization of said focus detecting systems, a stop for limiting the quantity of light entering said secondary optical system, and light receiving means for detecting the relative positional relation between the respective light intensity distributions, said first and second focus detecting systems differing from each other in the auxiliary illumination. This allows a central portion of the detection field of view in the light intensity distribution area of the object image to be detected, the optical path from the lens surface of said secondary optical system to said light receiving means being filled with an optical member formed of a transparent medium having a refractive index higher than that of air.

Said optical member comprises a prism having a reflecting surface for deflecting a light beam incident from the first lens surface of said secondary optical system, said reflecting surface reflecting the incident light in a direction substantially perpendicular to a segment linking the center points of the stops of said first and second focus detecting systems.

BRIEF DESCRIPTION OF THE DRAWINGS

FIGS. 3 to 7A, 7B and 7C illustrate various elements according to an embodiment of the present invention.

DESCRIPTION OF THE PREFERRED EMBODIMENTS

Figure 1:
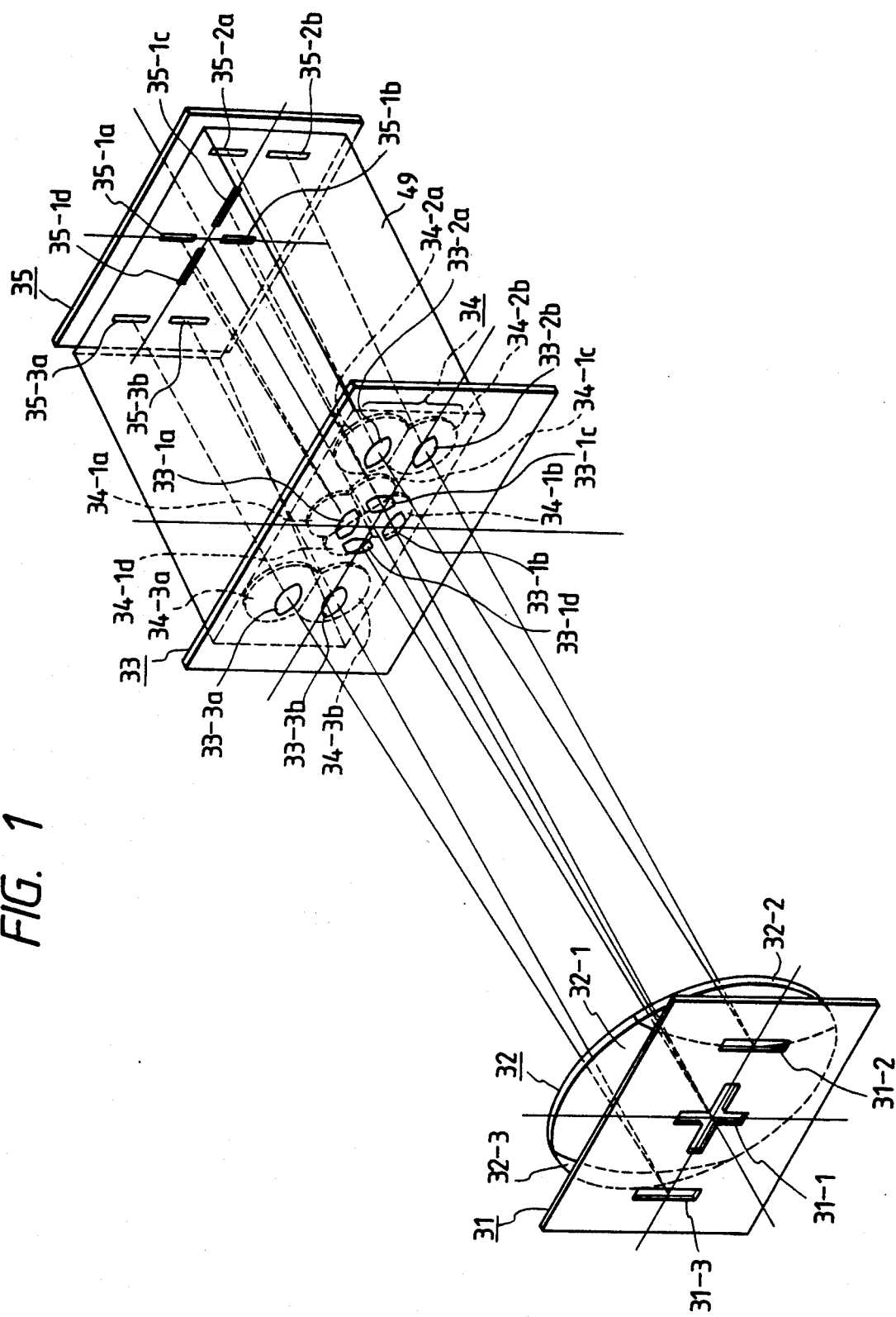
FIG. 1 is a perspective view showing the essential portions of an optical system according to an embodiment of the present invention.
Figure 2:
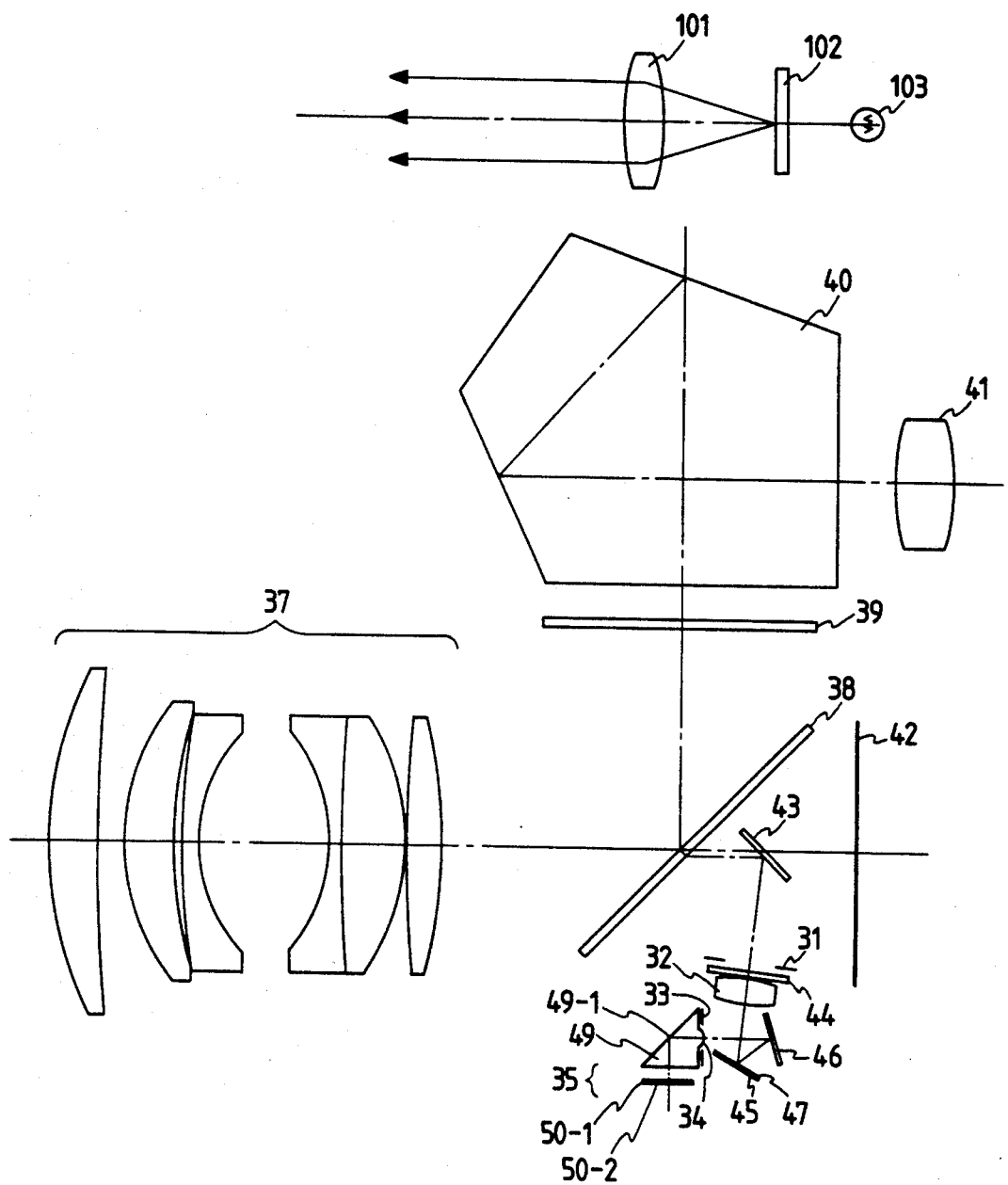
FIG. 2 is an optical cross-sectional view of the present invention as it is applied to a single-lens reflex camera.

FIG. 1 schematically shows the essential portions of an optical system according to an embodiment of the present invention, and FIG. 2 schematically shows the essential portions of an embodiment when the focus detecting device of the present invention shown in FIG. 1 is applied to a single-lens reflex camera.

Figure 12:
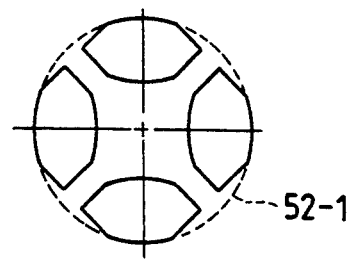
FIG. 12 shows stop openings for comparison with the present embodiment.

The present embodiment differs greatly from the prior-art focus detecting device shown in FIG. 12 in optical elements in the optical path leading from a secondary optical system to light receiving means (sensor).

A description will now be given of the construction of the focus detecting system shown in FIG. 1.

In FIG. 1, the reference numeral 31 designates a field mask having, for example, a Grecian cruciform opening 31-1 intersecting substantially at the center of the photographing picture plane provided by the objective lens (photo-taking lens) 37 of FIG. 2 and vertically long openings 31-2 and 31-3 in the marginal portion of the field mask on both sides of the opening 31-1. The reference numeral 32 denotes a field lens comprising three areas 32-1, 32-2 and 32-3 each having a predetermined optical characteristic disposed correspondingly to the three openings 31-1, 31-2 and 31-3 in the field mask 31. The reference numeral 33 designates a stop having in the central portion thereof a vertical pair of openings 33-1a and 33-1b and a horizontal pair of openings 33-1c and 33-1d which are inscribed to a substantially circular area 52-1, and two pairs of openings 33-2a and 33-2b and 33-3a and 33-3b formed in the right and left marginal portions of the stop and inscribed to substantially circular areas 52-2 and 52-3, respectively. The areas 32-1, 32-2 and 32-3 of the field lens 32 have the function of imaging the pairs of openings 33-1, 33-2, 33-3 in the stop near the exit pupil of the photo-taking lens 37 of FIG. 2. The reference numeral 34 denotes a secondary optical system which as a whole has four pairs of secondary imaging lenses. That is, the secondary optical system 34 as a whole comprises eight secondary imaging lenses 34-1a, 34-1b, 34-1c, 34-1d, 34-2a, 34-2b, 34-3a and 34-3b disposed rearwardly of the respective openings in the stop 33 correspondingly thereto.

The reference numeral 49 designates an optical member formed, for example, of polycarbonate resin or polystyrene resin which is a transparent medium, or glass or the like. The optical path leading from the secondary optical system 34 to a light receiving unit 35 which will be described is filled with the optical member 49 to adjust the length of the optical path. In FIG. 2, as will be described later, the optical member 49 is comprised of a prism having a reflecting surface.

The reference numeral 35 denotes a light receiving unit (a sensor unit) comprising a single substrate. The light receiving unit 35 as a whole has four pairs of sensor arrays. That is, the light receiving unit 35 as a whole comprises eight sensor arrays 35-1a, 35-1b, 35-1c, 35-1d, 35-2a, 35-2b, 35-3a and 35-3b disposed correspondingly to the secondary imaging lenses so as to receive the light intensity distributions regarding the images thereof.

In the present embodiment, the elements 31-1, 32-1, 33-1a, 33-1b, 34-1a, 34-1b, 35-1a and 35-1b together constitute a first focus detecting system, the elements 31-2, 32-2, 33-2a, 33-2b, 34-2a, 34-2b, 35-2a and 35-2b together constitute a second focus detecting system, and the elements 31-3, 32-3, 33-3a, 33-3b, 34-3a, 34-3b, 35-3a and 35-3b together constitute a third focus detecting system.

The distance measuring principle of the focus detecting device of the present invention shown in FIG. 1, like the conventional so-called correlation system, is based on detecting the relative position of the images in the direction of array of the sensors forming a pair.

In the present embodiment, the construction as described above is adopted, whereby near the center of the photographing range photographed or observed by means of the objective lens 37 of FIG. 2, detection becomes possible even for an object whose light intensity distribution varies only in one of the vertical and horizontal directions, and detection can likewise be accomplished for objects lying at any other positions than the center, for example, positions spaced apart from each other about the center.

A description will now be given of various elements when the present invention of FIG. 1 is applied to a single-lens reflex camera.

In FIG. 2, the reference numeral 37 designates a fixed or removably mounted photo-taking lens (objective lens), the reference numeral 38 denotes a quick return mirror, the reference numeral 39 designates a focusing screen, the reference numeral 40 denotes a pentaprism, the reference numeral 41 designates an eyepiece, the reference numeral 42 denotes a film surface, and the reference numeral 43 designates a sub-mirror secured to a portion of the quick return mirror 38. The reference numeral 31 denotes a field mask disposed at a position substantially optically equivalent to the film surface 42. The reference numeral 44 designates an infrared cut filter disposed rearwardly of the field mask 31. The reference numeral 32 denotes a field lens, the reference numerals 45 and 46 designate first and second total reflection mirrors, respectively, the reference numeral 47 denotes a light-intercepting mask, the reference numeral 33 designates a stop, and the reference numeral 34 denotes a secondary optical system formed integrally with an optical member 49 comprising a prism which will be described later. The optical member 49 comprising the prism of FIG. 2 as is developed below corresponds to the optical member 49 of FIG. 1. The reference numeral 35 designates a sensor unit having cover glass 50-1 and a light receiving surface 50-2.

In the present embodiment, the field mask 31 to the sensor unit 35 correspond to the focus detecting device shown in FIG. 1.

Figure 9:
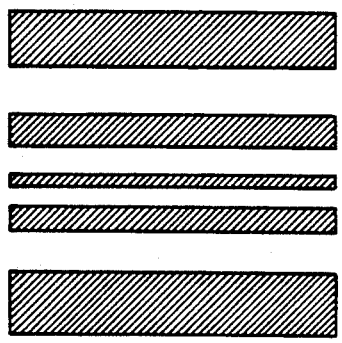
FIGS. 9 and 10 show projected patterns.

In FIG. 2, the optical path of the focus detecting optical system is bent by the use of three reflecting surfaces 45, 46 and 49-1, whereby the full length of the focus detecting optical system, particularly the spacing between the field lens 32 and the stop 33, is kept long. As previously described, the field lens 32 has the function of imaging the stop 33 near the exit pupil of the photo-taking lens 37, and by lengthening the spacing between the field lens 32 and the stop 33, it becomes possible to keep this imaging relation good and a brighter light beam can be directed to the focus detecting device. Also, in FIG. 2, the reference numeral 101 designates a light projection lens, and the reference numeral 102 denotes a pattern plate which projects a pattern as shown in FIG. 9 when the object to be photographed is dark or is low in contrast.

The features of the various elements shown in FIGS. 1 and 2 will now be described.

Figure 3:
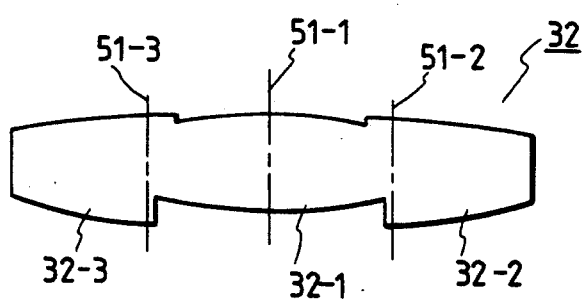

FIG. 3 is a view of the field lens as it is individually taken. This figure shows a cross-sectional shape taken along a plane containing the optic axis of the field lens 32 shown in FIG. 2 and perpendicular to the plane of the drawing sheet. The field lens comprises three areas 32-1, 32-2 and 32-3 disposed correspondingly to the three openings 31-1, 31-2 and 31-3 in the field mask 31, and the optic axes 51-2 and 51-3 of the lenses 32-2 and 32-3, respectively, forming the marginal areas which lie at positions deviating from the center 51-1. It is effective to make each lens surface of the field lens 32 aspherical to enhance the performance of the field lens 32. Particularly, by at least one of the two surfaces of each of the marginal lens portions 32-2 and 32-3 being formed by an aspherical surface, the quantity of light entering the focus detecting system from the marginal field of view can be increased.

Figure 4:
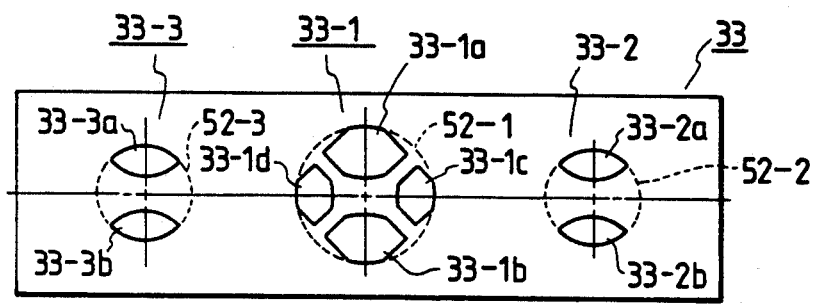

FIG. 4 is an illustration showing an embodiment of the shapes of openings in the stop 33. The central group of openings comprises a vertical pair of openings 33-1$a$ and 33-1$b$ and a horizontal pair of openings 33-1$c$ and 33-1$d$ which are inscribed to a substantially circular area 52-1. The right and left marginal openings comprise a vertical pair of openings 33-2$a$ and 33-2$b$ and a vertical pair of openings 33-3$a$ and 33-3$b$, respectively, which are likewise inscribed to substantially circular areas 52-2 and 52-3, respectively.

Figure 5:
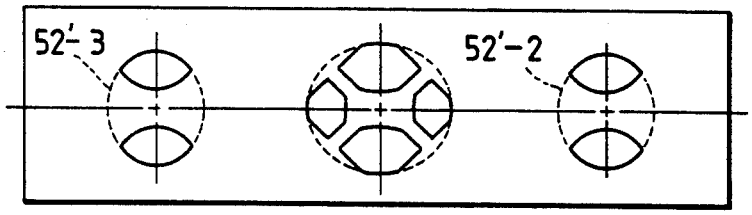

In the present embodiment, the openings in the stop 33 are such that the diameters of the areas 52-2 and 52-3 are set to be smaller than the diameter of the area 52-1 because the aperture eclipse of the photo-taking lens 37 is greater in the marginal portion thereof than in the central portion thereof. The aperture eclipse of the photo-taking lens 37 in the marginal portion thereof occurs chiefly in the horizontal direction in FIG. 4 and therefore, it is also possible that the openings in the stop are formed in vertically long elliptical areas 52'-2 and 52'-3 as shown in FIG. 5. By doing so, it becomes possible to introduce a greater quantity of light.

As shown in FIG. 4, the openings in the stop 33 are such that in the central portion, the upper and lower openings 33-1$a$ and 33-1$b$ are larger than the right and left openings 33-1$c$ and 33-1$d$. This is for the following reasons.

In a camera using a focus detecting device, there is often adopted a system whereby when the object to be photographed is low in contrast, an auxiliary light is projected onto the object side, thereby effecting distance measurement by a pattern projected onto the object. In such case, it is necessary to project a lateral-striped pattern onto the marginal field of the photographing picture plane, and the projection of a similar lateral-striped pattern also onto the central field will make the construction of the light projection system simpler. Accordingly, in the central field, making the upper and lower openings larger so that a light beam becoming capable of distance measurement for lateral stripes may be more directed will be able to more effectively achieve the purpose of the auxiliary light which enlarges the low luminance limit. This will be described later.

Figure 6:
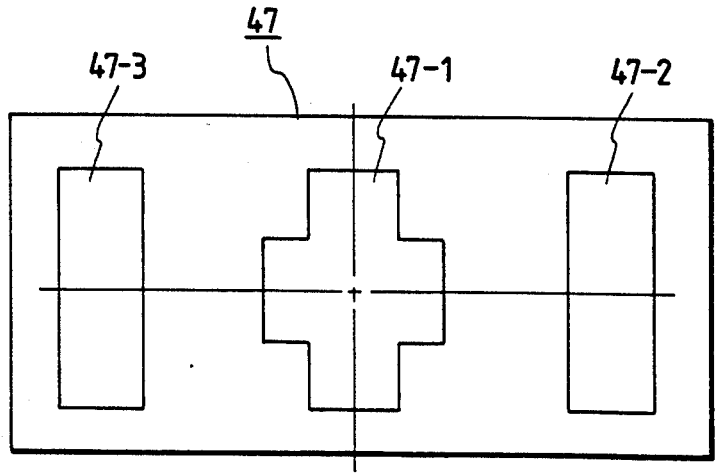

FIG. 6 shows the shapes of openings 47-1, 47-2 and 47-3 in the light-intercepting mask 47 of FIG. 2 as it is individually taken. This light-intercepting mask 47 serves to prevent undesired light which enters the marginal opening 31-2 or 31-3 in the field mask 31 of FIG. 1 and does not pass through the marginal openings 33-2$a$, 33-2$b$, 33-3$a$, 33-3$b$, etc. in the stop 33 but is transmitted through the central openings 33-1$a$, 33-1$b$, 33-1$c$, 33-1$d$, etc. in the stop 33 from reaching the surface of the sensor 35. The undesired light reaches the portion between the openings 47-1 and 47-2 or the openings 47-1 and 47-3 in the light-intercepting mask 41, and thus is intercepted. The light-intercepting mask 47 need not always be provided at this position, but may be provided immediately forward of the second reflecting mirror 46 of FIG. 2, or rearward of the field lens 32, or forward of the stop 33. If the undesired light cannot be fully intercepted by a single light intercepting mask, it is also possible to use a combination of several such masks. Also, instead of providing a light-intercepting mask immediately forward of the first and second mirrors 45 and 46, the reflecting surfaces of these mirrors may be patternized so that the light may be absorbed or transmitted in the other portions than necessary.

Figure 7A:
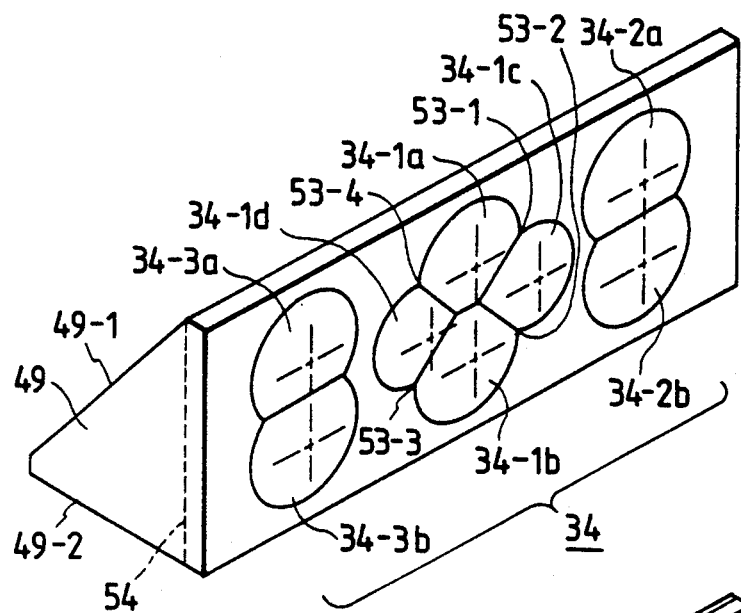

FIG. 7A is a perspective view showing the secondary optical system 34 of FIG. 2 and the optical member (prism member) 49 comprising a prism. The secondary optical system 34 comprises four pairs of secondary imaging lenses 34-1$a$ and 34-1$b$, 34-1$c$ and 34-1$d$, 34-2$a$ and 34-2$b$, and 34-3$a$ and 34-3$b$ of positive refractive power which are convex toward the stop 33, and is made integral with the prism member 49.

The prism member 49 has a reflecting surface 49-1 formed by film of a metal such as aluminum being deposited by evaporation, and has the function of reflecting the light beam from the secondary optical system 34 and deflecting it to the exit surface 49-21 thereof.

The reflecting film of aluminum or the like is not necessary when the light beam incident on the reflecting surface 49-1 satisfies the condition of total reflection. Even when there exists a light beam Which does not satisfy the condition of total reflection for the reflecting surface 49-1 inclined at 45°, it is possible to totally reflect all light beams by inclining the reflecting surface so as to be more approximate to the horizontal than 45°. In this case, by inclining the exit surface 49-2 of the prism member 49 and the sensor 35 of FIG. 2 from the horizontal correspondingly thereto, it is possible to eliminate the optical influence of the reflecting surface 49-1 being inclined. It is also effective to form the prism member 49 of glass of high refractive index or a plastic of high refractive index such as polycarbonate or polystyrene in order to make the critical angle smaller and facilitate the total reflection.

If in the present embodiment, the imaging magnification is small in the focus detecting system of the secondary imaging type, the accuracy of focus detection will be reduced and therefore, it is desirable to secure an imaging magnification to a certain degree. However, too great an imaging magnification would result in the bulkiness of the sensor which in turn would lead to a disadvantage both in space and cost and therefore, it can be said to be desirable that at least reduced imaging be adopted. Assuming that the secondary imaging lens 54 is of a plate-like shape as shown in FIG. 11A, and that the prism member having a reflecting surface as in the present embodiment is not provided but the sensor 35 is provided on the direct extension of the optic axis, the distance from the secondary imaging lens 54 to the sensor 35 cannot be secured sufficiently, for example, because of the interference with a mechanical member such as a mount for mounting the objective lens, not shown, and the imaging magnification of the secondary imaging lens will unavoidably become considerably small.

Figure 11B:
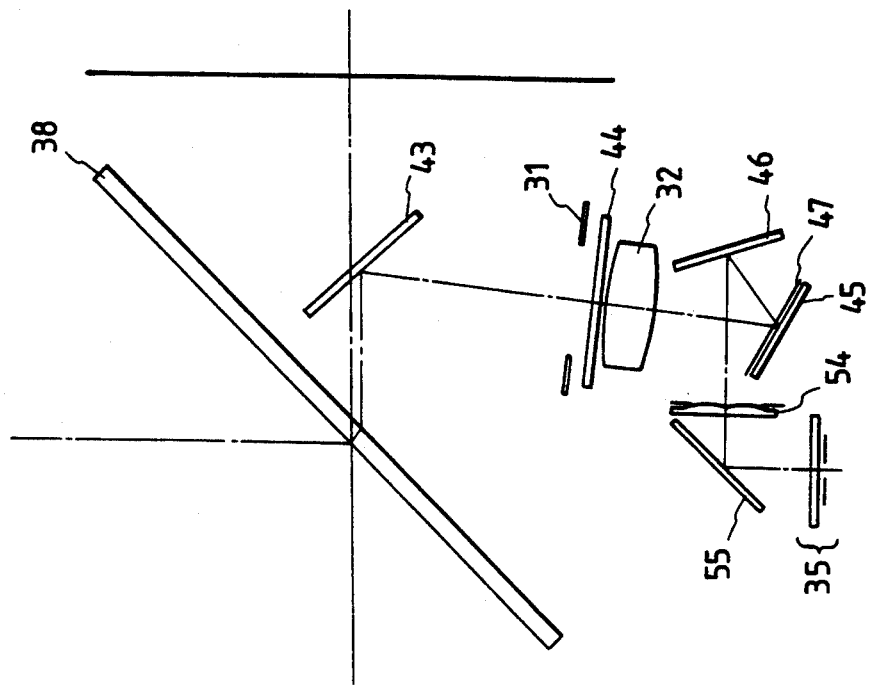
FIGS. 11A and 11B show optical arrangements supposed to make the effect of the embodiment readily understood.
Figure 11A:
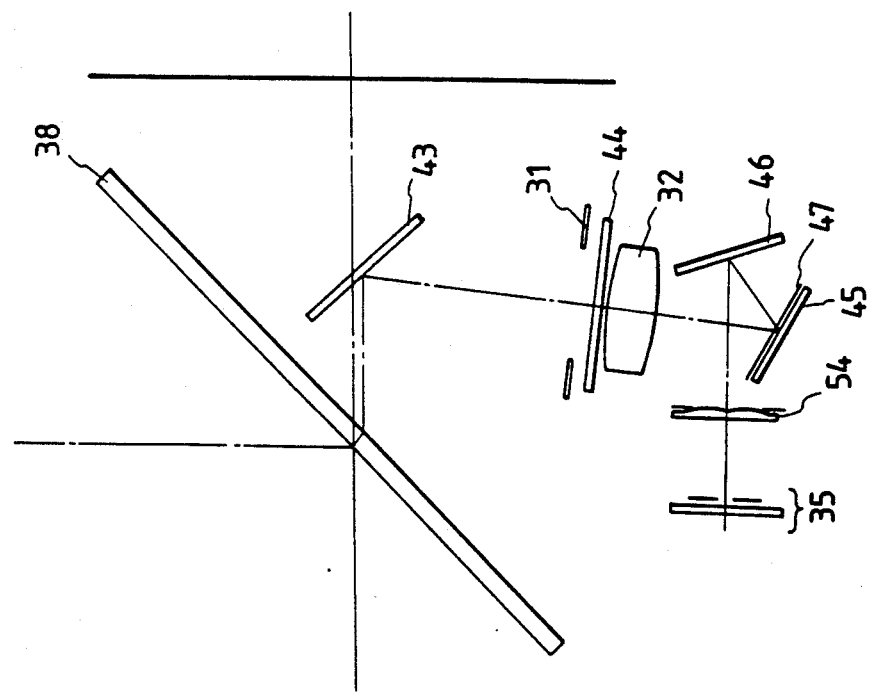

On the other hand, if the secondary imaging lens 54 is of a plate-like shape as shown in FIG. 11B and the prism member having a reflecting surface as in the present embodiment is replaced by an ordinary mirror 55, the length of the optical path from the secondary imaging lens 54 to the sensor will become long and the imaging magnification of the secondary imaging lens will tend to become too great.

In contrast, by adopting a construction in which the optical path is filled with the prism member 49 as in the present embodiment shown in FIG. 2, and changing the size of the prism member 49, it becomes possible to control the length of the optical path and an optimum design regarding the aforedescribed imaging magnification can be readily accomplished in a limited space.

In FIG. 7, the adjacent lenses of the secondary optical system 34 share a chord as a border line and are in contact with each other. With such a construction, the lens diameters can be secured greatly and it becomes possible to increase the quantity of light. It is advantageous in mold working to set the diameters of the four secondary imaging lenses 34-1a, 34-1b, 34-1c and 34-1d in the central portion so that they may coincide with one another at the end points 53-1, 53-2, 53-3 and 53-4 of the chord common to the outer peripheries of the adjacent lenses. Accordingly, where the shape of the stop 33 is made unequal in the vertical direction and the horizontal direction as shown in FIG. 4, the lens diameters in the vertical direction and the horizontal direction do not always coincide with each other. Further, the radii of curvature of the lens group 34-1 in the central portion and the lens group 34-2 or 34-3 in the marginal portion may be equal to each other or may differ from each other. In some cases, it is effective to make these radii of curvature different from each other. For example, the field lens 32 comprises three different areas as shown in FIG. 3 and therefore, the thickness and the manner in which the light is deflected differ between the central portion and the marginal portion and the lengths of the optical paths to the surface of the sensor 35 do not always coincide with each other. So, in the central portion and the marginal portion of each secondary imaging lens, the radii of curvature of that lens are made different from each other, whereby it becomes possible to image well on the surface of the same sensor 35. Particularly, the light beam from the marginal portion follows an optical path somewhat inclined toward the center and thus, generally, the length of the optical path of the marginal light beam to the surface of the sensor 35 is longer than that of the central light beam and therefore, it is effective to make the radii of curvature of the marginal secondary imaging lenses 34-2 and 34-3 somewhat larger than that of the central secondary imaging lens. Also, if the spacing between the secondary optical system 34 and the stop 33 becomes wider, it will be necessary to make each opening in the stop 33 small in order that the light beam may not reach the vicinity of the border line between the divided lenses, and it will become difficult to secure a sufficient quantity of light. For this reason, in the present embodiment, each secondary imaging lens is constructed of a lens surface convex relative to the stop 33 and is disposed in contact with the stop 33.

By appropriately setting each element in the optical path leading from the two optical systems to the light receiving means as previously described, it is possible to achieve the compactness of the entire device, contain the device well in a limited space within a camera or the like and increase the degree of freedom of assemblage.

Figure 16:
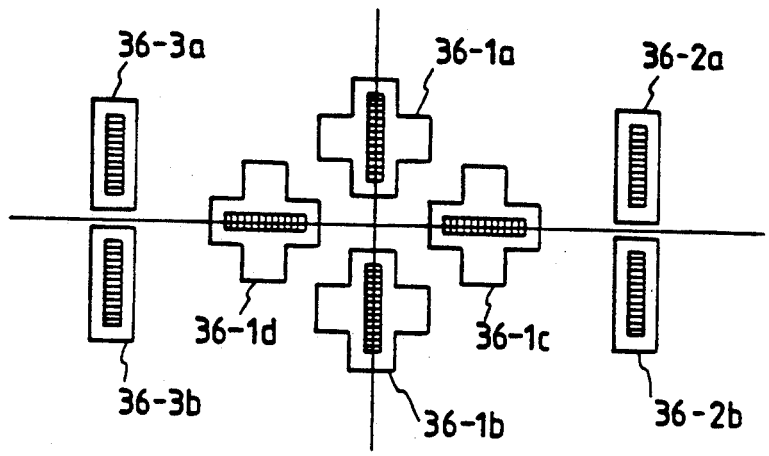
FIG. 16 is a front view of the sensor unit of FIG. 15.
Figure 17:
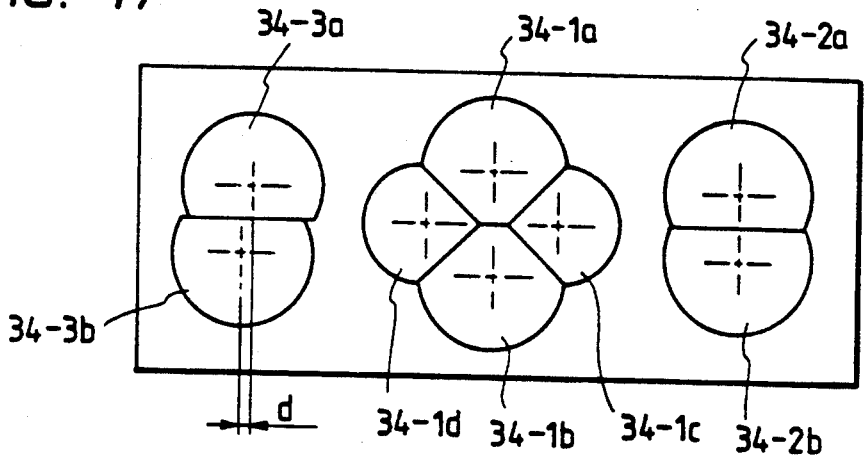
FIG. 17 is a front view of the secondary imaging lens.
Figure 18:
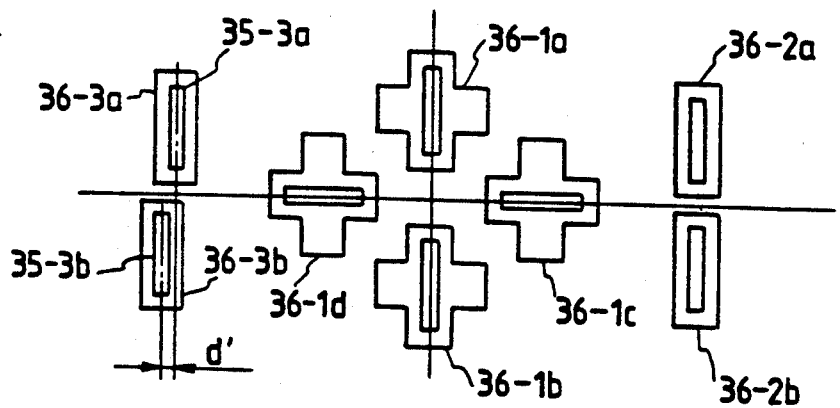
FIG. 18 shows a projected image of the secondary imaging lens onto the sensor.

On the other hand, FIG. 17 is an illustration depicting the secondary imaging lens 34 from the front thereof. For example, let it be assumed that as shown in FIG. 17, the vertex of the lens surface of one of eight secondary imaging lenses, 34-3b, has been displaced leftwardly by a distance d. Then, by this secondary imaging lens 34-3b, the projected image of the field mask projected by the sensor 35 becomes such as shown in FIG. 18. In FIG. 18, unlike FIG. 16, the projected image 36'-3b corresponding to the secondary imaging lens 34-3b is displaced leftwardly by a distance d'. Here, the relation between the distances d and d' can be virtually expressed as:

$$d' = d \cdot (1 + |\beta|),$$

where $\beta$ is the imaging magnification of the secondary imaging lens. When such a state is brought about, the object side areas detected by the sensors 35-3a and 35-3b will become different from each other and accurate focus detection cannot be accomplished.

The ratio of the amount of out-of-focus of the objective lens to the amount of image deviation on the two sensors differs depending on the imaging magnification of the secondary imaging lens and the spacing between the centers of the openings in the stop, and usually is of the order of 1:30–50. That is, this means that if the images on the two sensors deviate from each other by 1 $\mu$m, the focus position of the objective lens will move by the order of 0.03–0.05 mm. Accordingly, if an attempt is made to effect the focus detection of the objective lens with an error less than 0.03–0.05 mm also for a pattern such as a black and white edge inclined at 45°, the allowable deviation of the position of the vertex of the secondary imaging lens will be 1 $\mu$m even if it approximates to d—d', and this is very severe.

When as shown in FIG. 2, the secondary imaging lens 34 is formed on the surface of the prism member 49 to thereby make a unitary construction, if these are formed of plastic, the vertex of the secondary imaging lens may deviate greatly under the control of the complicated contraction of the prism member which is large in volume and triangular in shape.

Further, if the prism member 49 is formed of plastic, it will be necessary to take the expansion thereof caused by moisture absorption and a variation in the refractive index thereof sufficiently into consideration, and generally, a plastic material such as acryl readily absorbs moisture and experiences expansion and a variation in the refractive index thereof. Where the refractive index varies uniformly over the entire prism member, the influence thereof is not so great, but if the distribution of the refractive index occurs toward the interior of the prism member due to the moisture absorption from the surface of the prism member, light rays transmitted through the interior of the prism member will be bent and accurate focus detection will become difficult. Particularly, in the case of the prism member 49 which is large in volume, moisture absorption will progress to the interior thereof and a long time will be required until a balanced state is reached, and the influence thereof is very great.

Where focus detection is effected at a plurality of points in the photographing range as described above, it is conceivable that the accuracy of focus detection is affected by various causes.

In the example shown in FIG. 7A, the surface 34-4 of the secondary optical system 34 which is adjacent to the light receiving means and the entrance surface of the prism member 49 may be adhesively secured to each other at a location 54, but alternatively, they may be disposed in opposed relationship with each other with a slight gap therebetween.

However, if the exit surface of the secondary optical system 34 and the entrance surface of the prism member 49 are adhesively secured to each other, the reflection of the light on the surface of each member can be decreased and the quantity of transmitted light can be increased, and also the creation of the ghost light can be prevented, and this is preferable.

Also, in the present embodiment, the secondary optical system 34 is made into a thin plate of good symmetry in shape, whereby the uniformity of contraction during the molding of plastic can be improved and thus, there can be obtained a molded article which is small in the deviation of the vertex position of the lens surface of the secondary imaging lens.

Also, regarding the aforedescribed influence of moisture absorption, where the secondary optical system 34 and the prism member 49 are separate members as shown in the present embodiment, the secondary optical system 34 which suffers little from the influence of moisture absorption may be formed, for example, of acryl which is great in moisture absorption but good in moldability and heat resistance and the prism member which suffers greatly from the influence of moisture absorption may be formed of polycarbonate, polystyrene, MS resin or the like which is low in moisture absorption, whereby it becomes possible to suppress the influence of moisture absorption as a whole. Of course, preference may be given to the utmost reduction in the influence of moisture absorption and the secondary optical system may also be formed of one of these materials. Particularly, polycarbonate and polystyrene are high in refractive index as compared with acryl and are preferable plastic materials when the reflection by the prism member is total reflection.

If the prism member 49 is formed of glass, it will be more effective in the sense that the influence of moisture absorption is reduced. The prism member is of a simple shape surrounded by flat surfaces and therefore can be formed of glass relatively easily.

Figure 7B:
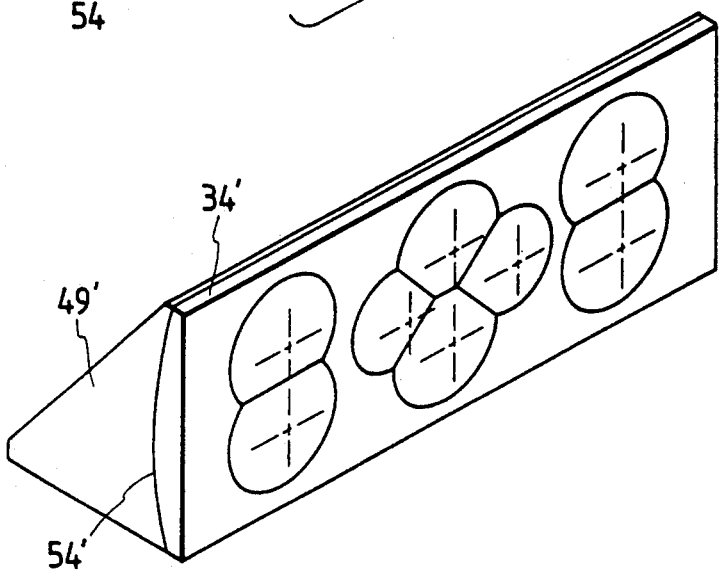

On the other hand, as shown in FIG. 7B, the secondary optical system 34' and the prism member 49' may be formed of plastics or glasses differing in Abbe number from each other, and may be cemented together with a curvature given to the cemented surface 54' therebetween, as required, whereby the elimination of chromatic aberration becomes possible.

Figure 7C:
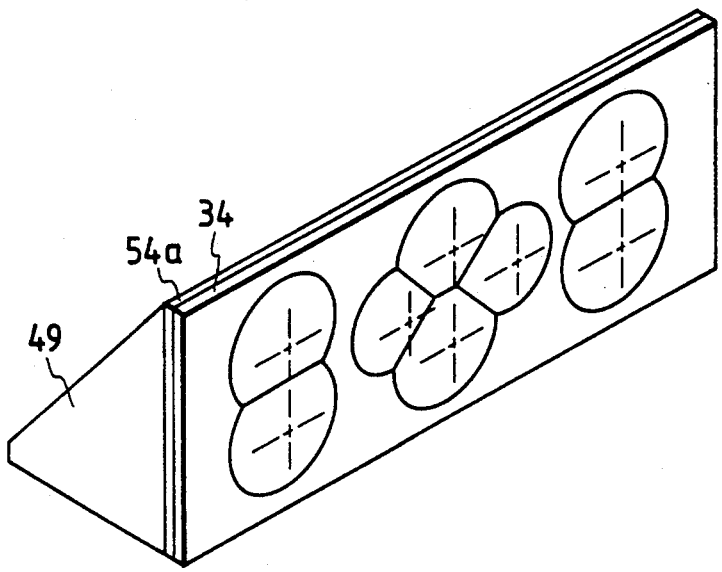

Further, as shown in FIG. 7C, the secondary optical system 34 and the prism member 49 may be cemented together with an infrared cut filter 54a of the absorption type interposed therebetween. An infrared cut filter of the absorption type, as compared with one of the evaporated type, is characterized by inexpensiveness and low angle dependency of spectral transmittance, but has a problem in environmental resistance and is generally little used.

Particularly, it may be deteriorated in characteristics due to being emulsified by moisture absorption, and it has been difficult for such a filter to be used in cameras or the like which are used in severe environments. However, if the infrared cut filter 54a of the absorption type is interposed between the secondary optical system 34 and the prism member 49 and the three are cemented together or an adhesive agent is also applied to the end surfaces thereof to thereby shield the infrared cut filter from the atmosphere, the problem of moisture absorption as noted above will be solved and such a filter will become usable. The infrared cut filter 44 of FIG. 1 should effectively be provided at a low position so that the light from the photo-taking lens may not be reflected into the film surface, and has required much space, but if an infrared cut filter of the absorption type is inserted between the secondary optical system and the prism member, the infrared cut filter 44 will become unnecessary, and this will be very advantageous in making the focus detecting system compact.

Turning back to the embodiment of FIG. 2, it has already been described that the upper and lower openings 33-1a and 33-1b are larger in area than the right and left openings 33-1c and 33-1d. If based on the concept that the focus detecting system corresponding to the upper and lower openings 33-1a and 33-1b and the focus detecting system correspoding to the right and left openings 33-1c and 33-1d are dealt with equally and the limits on the low luminance side of an object to be photographed for which the two focus detecting systems can operate are made equal, the central opening in the stop 33 may be equally divided into four as shown, for example, in FIG. 12.

Figure 13:
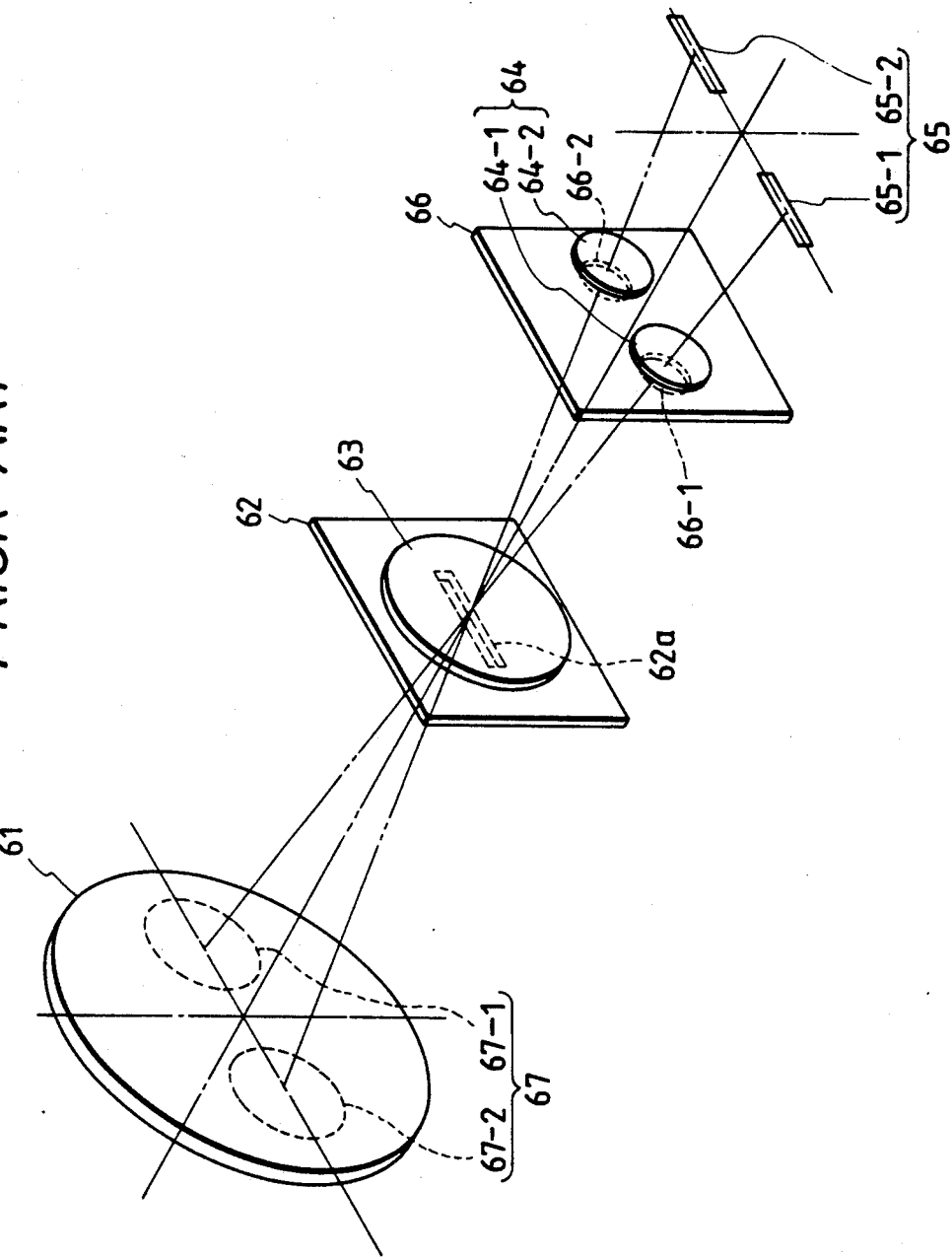
FIGS. 13 and 14 are perspective views of the devices according to the prior art.
Figure 14:
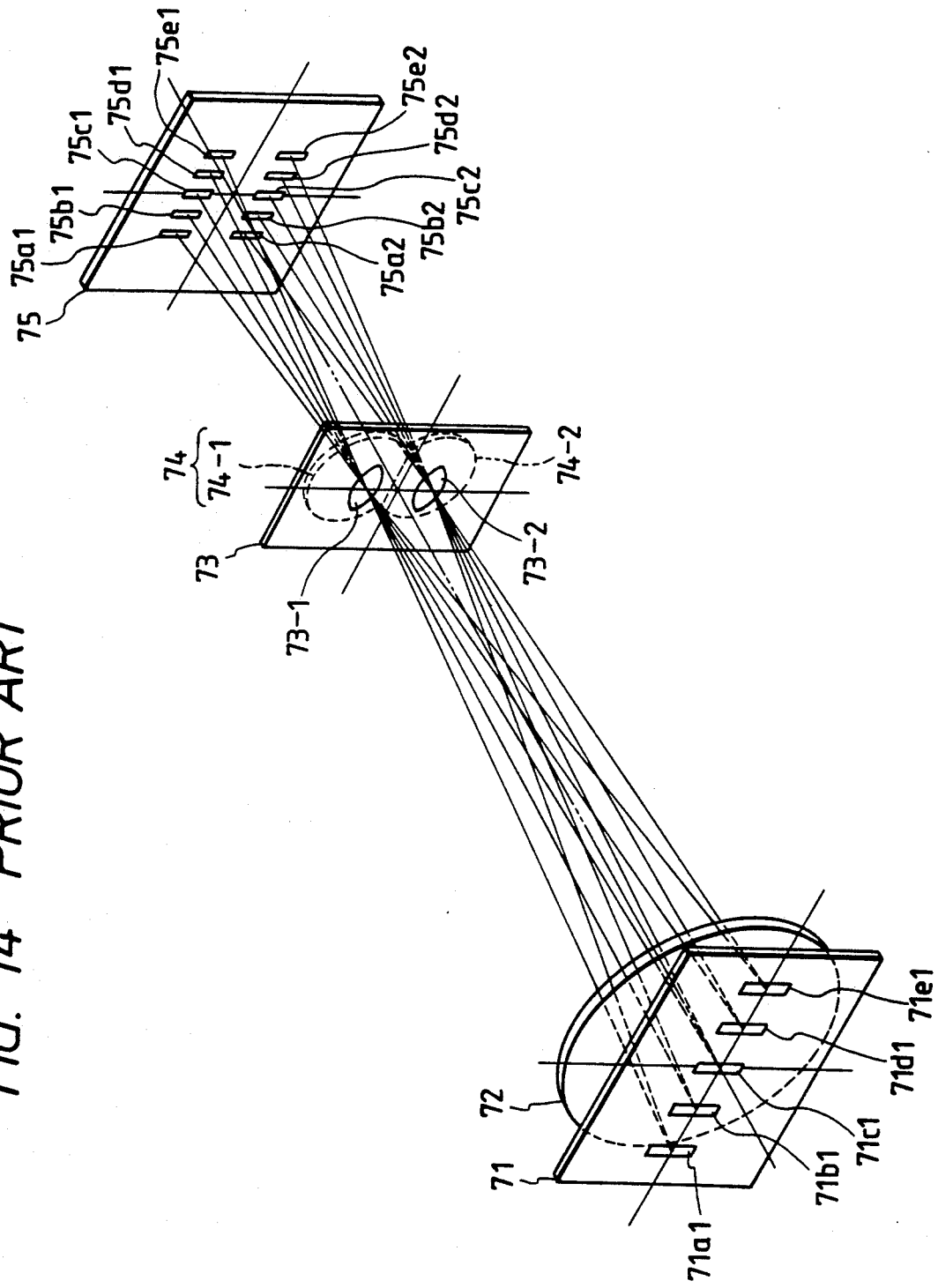
Figure 15:
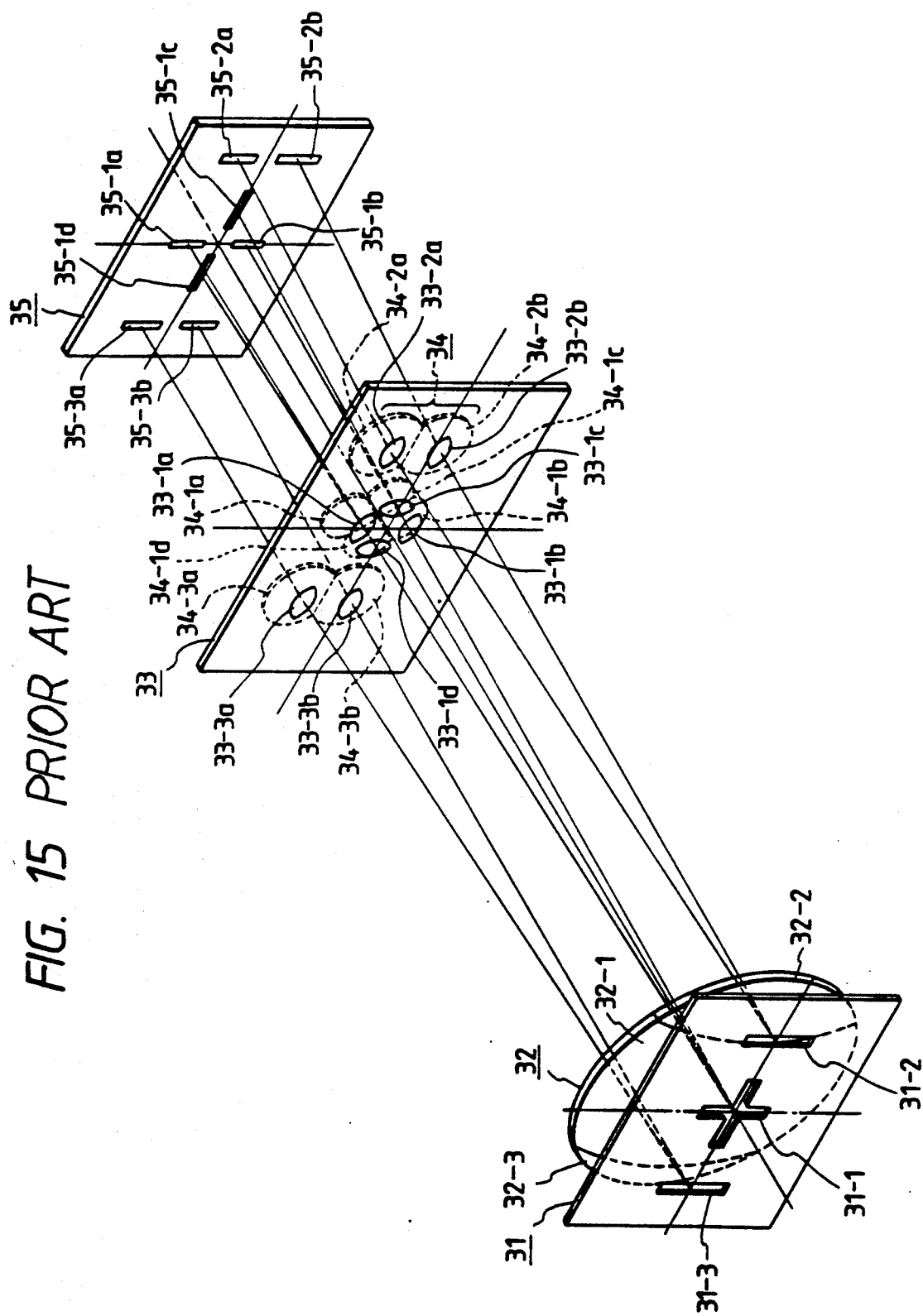
FIG. 15 is a perspective view of the related art.

In this case, however, as compared with the prior-art focus detecting device as shown in FIG. 13 wherein there are only two openings in the stop, the quantity of light entering the focus detecting system will decrease to one half or less and focus detection will become impossible for a dark object to be photographed or the accuracy of focus detection will be reduced. When the object to be photographed is particularly dark, it is necessary to operate an auxiliary illuminating system and project a pattern onto the object to be photographed to secure brightness and contrast, but again at this time, as compared with the prior-art focus detecting device, a remarkable disadvantage is unavoidable with regard to brightness.

In contrast, if use is made of the stop opening of the stop according to the present invention as shown in FIG. 2, when the luminance of the object to be photographed is low and an auxiliary illuminating system is used, a reduction in the quantity of light is alleviated because the stop openings 33-1a and 33-1b of the focus detecting system which can more easily detect the projected pattern of the auxiliary illuminating system as shown in FIG. 9 are larger, and thus, it becomes possible to prevent the low luminance limit from becoming extremely high. In FIG. 9, the portions indicated by hatching are non-light-transmitting zones.

In the present embodiment, use is made of an example in which the projected pattern of the auxiliary illuminating system is lateral stripes as shown in FIG. 9, and this is because it is taken into consideration that the projected pattern of the auxilairy illuminating system to be used in the other two right and left marginal fields of view than the center of the focus detecting device shown in FIG. 1 is similar lateral stripes.

That is, if the directions of change in the distributions of quantity of light of the projected patterns of the auxiliary illuminating systems used in three fields of view are the same, it will become possible to illuminate the three fields of view at a time by projecting a pattern, and this will become very advantageous in simplifying the construction of the auxiliary illuminating system.

In the present invention, as regards the shape of the stop for making the optical characteristics of the stop openings in the central portion of the stop 33 different from each other, various modifications, in addition to the shape shown in FIG. 2, are applicable.

Figure 8A:
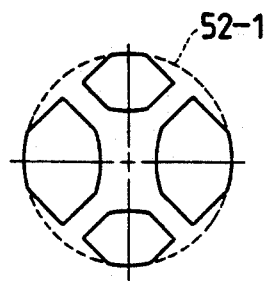
FIGS. 8A, 8B and 8C show stop openings.
Figure 8B:
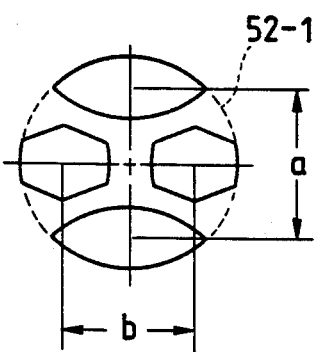
Figure 8C:
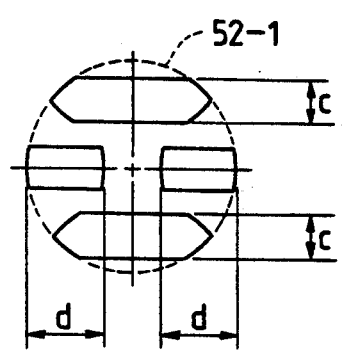

FIGS. 8A, 8B and 8C show the shapes of the stop openings in the central portion of the stop 33 according to the present invention.

Figure 10:
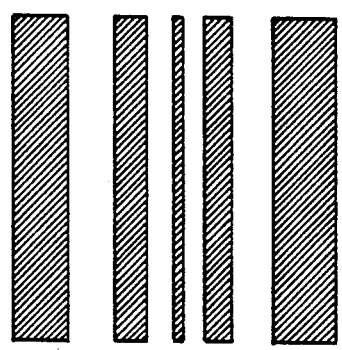

In the embodiment shown in FIG. 8A, the central openings in the stop correspond to the central openings in the stop of the FIG. 2 embodiment as they are rotated by 90°, and are applied when the projected pattern of the auxiliary illuminating system is vertical stripes as shown in FIG. 10. The projected pattern of the existing auxiliary illuminating system incorporated in a stroboscopic lamp used in the conventional focus detecting device as shown in FIG. 13 is often vertical stripes, and is effective when it is usable and the conformability thereof to the conventional system is to be maintained.

The feature of the embodiment of FIG. 8B is that among the four central openings in the stop, the spacings a and b between the centers of the two openings forming a pair are in the relation that a>b. The spacing between the centers of the two openings forming a pair corresponds to the so-called base line length in focus detection, and it is well known that the longer it is, the higher becomes the accuracy of focus detection.

In the present embodiment, the base line length of the focus detecting system which can more easily detect the projected pattern of the auxiliary illuminating system is made greater, thereby preventing any reduction in the accuracy of focus detection during the time of low contrast.

The feature of the embodiment of FIG. 8C is that the opening widths c and d of the four openings in the stop in the direction of each field of view, i.e., the direction in which the image deviates due to the focus state of the objective lens, are in the relation that c<d. In other words, the opening width in the direction of the field of view corresponds to the F-number in the same direction, and in a range within which the influence of diffraction can be neglected, the greater it is (the narrower the opening width is), the higher becomes the contrast in the direction of the field of view of the image formed on the sensor.

In the present embodiment, the F-number in the direction of the field of view of the focus detecting system which can more easily detect the projected pattern of the auxiliary illuminating system is made greater, thereby preventing any reduction in the accuracy of focusing during the time of low luminance and low contrast.

The stops of FIGS. 8B and 8C are ones for a case where the projected pattern of the auxiliary illuminating system has a variation in quantity of light chiefly in the vertical direction, but where said pattern has a variation in quantity of light chiefly in the horizontal direction, the stop openings may be rotated by 90° and replaced with each other just as in the relation between FIGS. 2 and 8A. Also, while in the foregoing, the various elements regarding the stop openings such as area, base line length and F-number have been described individually, two or more of these may be made unequal to achieve the object of the present invention.

According to the present invention, in a focus detecting device having a plurality of focus detecting systems which share some of the fields of view in the photographing range and effect focus detection with respect to at least two directions which differ in the variation in the quantity of light of an object to be photographed, the optical characteristics as a stop such as the areas of the openings in the stop, the spacings between the centers of the openings and the opening widths are made unequal, whereby the rate of impossibility of focus detection for objects of low luminance can be decreased and the reduction in the accuracy of focus detection for objects of low luminance can be alleviated. Particularly, when an auxiliary illuminating system is used, the conformability to the projected pattern thereof is taken into consideration and therefore, there can be achieved a focus detecting device capable of accomplishing good focus detection even for objects at long distances.

We claim:

1. A device for detecting the focus adjusted state of an objective lens, comprising:

a first detecting system including first light intensity distribution forming means for forming from a light beam passing through the objective lens a light intensity distribution varying in relative position in conformity with a focus adjusted state of the objective lens, and first light receiving means responsive to the light intensity distribution to output a first signal indicative of the focus adjusted state and having a plurality of photosensors, said first detecting system having a first detection field and a first optical path;

a second detecting system having a second detection field having a center spaced apart from a center of said first detection field and a second optical path, said second detecting system including second light intensity distribution forming means for forming from the light beam passing through the objective lens a light intensity distribution varying in relative position in conformity with the focus adjusted state of the objective lens, and second light receiving means responsive to the light intensity distribution to output a second signal indicative of the focus adjusted state and having a plurality of photosensors; and a light transmitting optical member for adjusting the lengths of said first and second optical paths, said optical member comprising a block having an internal reflecting surface.

2. A device according to claim 1, wherein said first and second light intensity distribution forming means each have a pair of secondary imaging lenses, and the respective optical member is disposed between said secondary imaging lenses and said first and second light receiving means.

3. A device according to claim 2, wherein said secondary imaging lenses are coupled to said optical member.

4. A device according to claim 1, wherein said optical member comprises polycarbonate resin.

5. A device according to claim 1, wherein said optical member comprises polystyrene resin.

6. A device according to claim 1, wherein said optical member comprises optical glass.

7. A device according to claim 1, further comprising:
a third detecting system having a third detection field having a center spaced apart from the centers of said first and second detection fields, and a third optical path passing through said optical member, said third detecting system including third light intensity distribution forming means for forming from the light beam passing through the objective lens a light intensity distribution varying in relative position in conformity with the focus adjusted state of the objective lens, and third light receiving means responsive to the light intensity distribution to output a third signal indicative of the focus adjusted state and having a plurality of photosensors.

8. A device according to claim 7, wherein said first, second and third light receiving means are formed on a single substrate.

9. A device according to claim 1, wherein said first detecting system comprises two sub-detecting systems having sub-detection fields intersecting each other.

10. Apparatus for detecting the focus state of an objective lens, comprising:
a first detecting system including first light intensity distribution forming means for forming from a light beam passing through the objective lens a first light intensity distribution which varies in relative position in accordance with the focus state of the objective lens, and first light receiving means responsive to the first light intensity distribution for outputting a first signal indicative of the focus adjusted state of the objective lens, said first detecting system having a first detection field and a first optical path;
a second detecting system including a second light intensity distribution forming means for forming from a light beam passing through the objective lens a second light intensity distribution which varies in relative position in accordance with the focus state of the objective lens, and second light receiving means responsive to the second light intensity distribution for outputting a second signal indicative of the focus adjusted state of the objective lens, said second detecting system including a second detection field having a center which is spaced apart from a center of said first detection field, and a second optical path;
a light transmitting optical member for adjusting the lengths of said first and second optical paths; and
first and second reflection planes provided in an optical path which is defined by connecting said first and second light intensity distribution forming means and a prospective focusing plane of the objective lens, an optical path of a light beam directed toward said first reflection plane and the optical path of a light beam projected away from said second reflection plane crossing each other.

11. Apparatus according to claim 10, wherein said optical member comprises a single block having an internal reflection plane.

12. A device for detecting the focus adjusted state of an objective lens, comprising:
a first detecting system including first light intensity distribution forming means for forming from a light beam passing through the objective lens a first light intensity distribution varying in relative position in conformity with a focus adjusted state of the objective lens, and first light receiving means responsive to the first light intensity distribution to output a first signal indicative of the focus adjusted state and having a plurality of photosensors, said first detecting system having a first detection field; and
a second detecting system having a second detection field partially overlapping with said first detection field, said second detecting system including second light intensity distribution forming means for forming from the light beam passing through the objective lens a second light intensity distribution varying in relative position in conformity with the focus adjusted state of the objective lens, and second light receiving means responsive to the second light intensity distribution to output a second signal indicative of the focus adjusted state and having a plurality of photosensors, wherein
said first light intensity distribution forming means includes a set of first apertures, said second light intensity distribution forming means includes a set of second apertures, said first and second sets of apertures each partially border a hypothetical circumscribing circle, and an optical characteristic of said first apertures being different from that of said second apertures.

13. A device according to claim 12, wherein at least one of opening area, distance between centers of openings, and width of opening is different between the first set of apertures and the second set of apertures.

14. A device for detecting the focus adjusted state of an objective lens, comprising:
a first detecting system including first secondary imaging lens means for forming form a light beam passing through the objective lens a first light intensity distribution varying in relative position in conformity with a focus adjusted state of the objective lens, and first light receiving means responsive to the first light intensity distribution to output a first signal indicative of the focus adjusted state and having a plurality of photosensors, said first detecting system having a first detection field;
a second detecting system having a second detection field having a center spaced apart from a center of said first detection field, said second detecting system including second secondary imaging lens means for forming from the light beam passing through the objective lens a second light intensity distribution varying in relative position in conformity with the focus adjusted state of the objective lens, and second light receiving means responsive to the second light intensity distribution to output a second signal indicative of the focus adjusted state and having a plurality of photosensors;

a reflection surface, located on a light path between said first and second secondary imaging lens means and said first and second light receiving means, for reflecting said first and second light intensity distributions to said first and second light receiving means, respectively; and an optical transmission substance interposed between said reflection surface and said first and second secondary imaging lens means.

15. A device for detecting the focus adjusted state of an objective lens, comprising:

a first detecting system including first secondary imaging lens means for forming from a light beam passing through the objective lens a first light intensity distribution varying in relative position in conformity with a focus adjusted state of the objective lens, and first light receiving means responsive to the first light intensity distribution to output a first signal indicative of the focus adjusted state and having a plurality of photosensors, said first detecting system having a first detection field;

a second detecting system having a second detection field having a center spaced apart from a center of said first detection field, said second detecting system including second secondary imaging lens means for forming from the light beam passing through the objective lens a second light intensity distribution varying in relative position in conformity with the focus adjusted state of the objective lens, and second light receiving means responsive to the second light intensity distribution to output a second signal indicative of the focus adjusted state and having a plurality of photosensors;

a reflection surface, located on a light path between said first and second secondary imaging and said first and second light receiving means, for reflecting said first and second light intensity distributions to said first and second light receiving means, respectively; and an optical transmission substance interposed between said reflection surface and said first and second light receiving means.

16. A device for detecting the focus adjusted state of an objective lens, comprising:

a first detecting system including first secondary imaging lens means for forming from a light beam passing through the objective lens a first light intensity distribution varying in relative position in conformity with a focus adjusted state of the objective lens, and first light receiving means responsive to the first light intensity distribution to output a first signal indicative of the focus adjusted state and having a plurality of photosensors, said first detecting system having a first detecting field;

a second detecting system having a second detection field having a center spaced apart from a center of said first detection field, said second detecting system including second secondary imaging lens means for forming from the light beam passing through the objective lens a second light intensity distribution varying in relative position in conformity with the focus adjusted state of the objective lens, and second light receiving means responsive to the second light intensity distribution to output a second signal indicative of the focus adjusted state and having a plurality of photosensors; and a prism of triangular cross-section having an inclined reflection surface and being located adjacent to or connected to said first and second secondary imaging lens means.

* * * * *

UNITED STATES PATENT AND TRADEMARK OFFICE
CERTIFICATE OF CORRECTION

PATENT NO. : 5,262,819           Page 1 of 2
DATED      : November 16, 1993
INVENTOR(S): KEIJI OHTAKA, ET AL.

It is certified that error appears in the above-indentified patent and that said Letters Patent is hereby corrected as shown below:

ASSIGNEE at [73] On the title page,
  "Canon Kabushiki Kaishi," should be --Canon Kabushiki Kaisha,--.

Title page
REFERENCES CITED U.S. PATENT DOCUMENTS at [56]
  "4,878,078 11/1989 Koyama et al." should be
  --4,878,078 10/1989 Koyama et al.--.

Title page,
FOREIGN PATENT DOCUMENTS at [56]
  "62279835 5/1989 Japan" should be --62-279835 5/1989 Japan-- and "63274940 5/1990 Japan" should be --63-274940 5/1990 Japan--.

COLUMN 1
  Line 43, "rearwardly" should be --rearward--; and
  Line 46, "rearwardly" should be --rearward--.

COLUMN 3
  Line 9, "correspondingly" should be --corresponding--; and
  Line 49, "fomred" should be --formed--.

COLUMN 5
  Line 67, "rearwardly" should be --rearward--.

COLUMN 8
  Line 58, "Which" should be --which--.

UNITED STATES PATENT AND TRADEMARK OFFICE
CERTIFICATE OF CORRECTION

PATENT NO. : 5,262,819
DATED : November 16, 1993
INVENTOR(S) : KEIJI OHTAKA, ET AL.

It is certified that error appears in the above-indentified patent and that said Letters Patent is hereby corrected as shown below:

COLUMN 14
    Line 28, "as" (1st occurrence) should be --of--.

COLUMN 15
    Line 5, "the" should be deleted; and
    Line 6, "respective" should be --said--, and "said" should be --the respective--.

COLUMN 16
    Line 48, "form" should be --from--.

COLUMN 17
    Line 35, "imaging" should be --imaging lens means--.

Signed and Sealed this

Ninth Day of August, 1994

Attest:

BRUCE LEHMAN

Attesting Officer    Commissioner of Patents and Trademarks